Mar. 27, 1923.
J. SANDERS
1,450,050
AUTOMOBILE GEAR SHIFT PEDAL LOCK
Filed Apr. 1, 1922
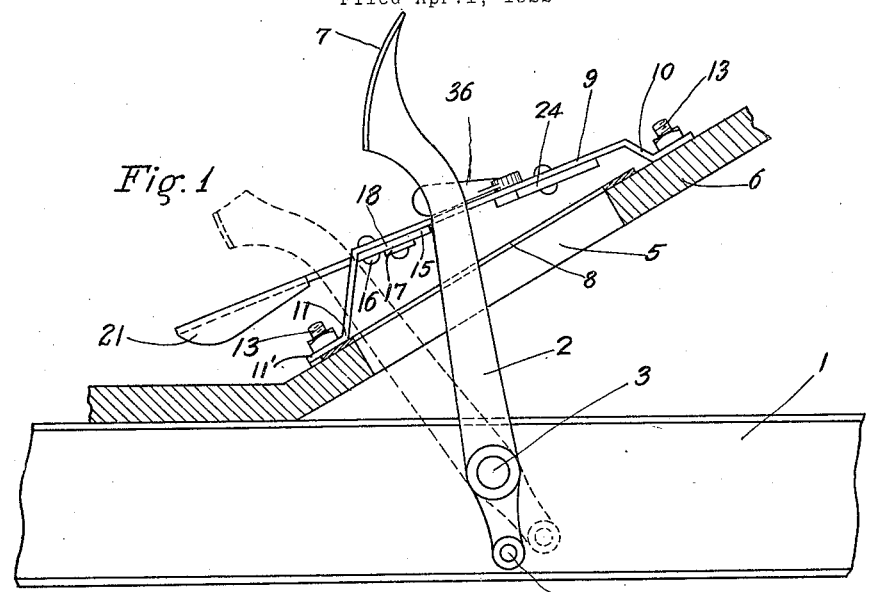
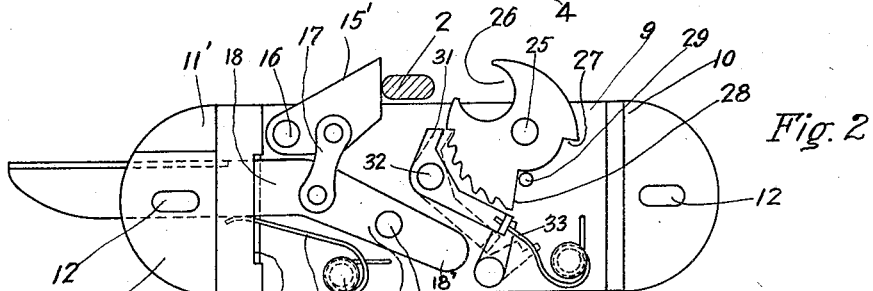
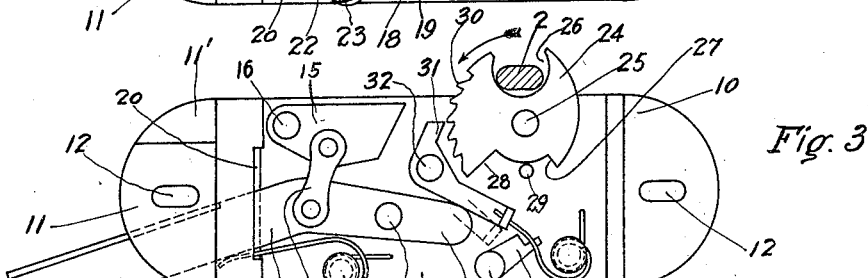
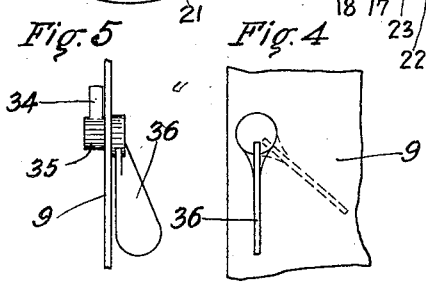
John Sanders.
INVENTOR.
BY
Mason Fenwick & Lawrence
ATTORNEY.

Patented Mar. 27, 1923.

1,450,050

UNITED STATES PATENT OFFICE.

JOHN SANDERS, OF DENVER, COLORADO, ASSIGNOR OF ONE-HALF TO CARLE WHITEHEAD, OF DENVER, COLORADO.

AUTOMOBILE GEAR-SHIFT PEDAL LOCK.

Application filed April 1, 1922. Serial No. 548,630.

*To all whom it may concern:*

Be it known that I, JOHN SANDERS, a citizen of the United States, residing at Denver, in the county of Denver and State of Colorado, have invented certain new and useful Improvements in Automobile Gear-Shift Pedal Locks; and I do hereby declare the following to be a full, clear, and exact description of the invention such as will enable others skilled in the art to which it appertains to make and use the same.

This invention relates to gear-shift pedal locks for automobiles and the like and especially to locks for holding a pedal in any of several different positions, as, for instance, holding the gear shift pedal on a Ford automobile in low gear or in neutral as desired.

An object of my invention is to provide, in a device of the class described, means for automatically engaging and holding a pedal in any desired one of a plurality of positions and means for readily releasing the pedal.

A further object is the provision of the aforesaid means and an automatic adjustment on the means for holding the pedal in one of said positions.

A further object is the provision of an attachment for automobiles having such holding and release means.

A further object is the provision of such an attachment which shall be inexpensive and compact and simple as to construction, installation and operation.

A further object is the provision in such attachment of means for locking one of the holding means in inoperative position.

With these and other objects in view my invention comprises certain novel constructions, combinations and arrangements of parts as hereinafter more fully described and claimed and as illustrated in the accompanying drawing in which like characters of reference indicate corresponding parts throughout the several views and in which Figure I is a side elevation of my attachment mounted in position on the automobile foot board, shown in cross section, beside the gear shift pedal, shown in elevation, as being held in neutral position.

Figure II is a bottom plan showing pedal locked in neutral position and the holding means for low gear locked in inoperative position, the operative position being indicated in dotted lines.

Figure III is a bottom plan showing holding means for neutral and low gear withdrawn from operative positions, pedal being in low gear, being there held by foot pressure in the usual manner, not shown.

Figures IV and V show details of the means for locking the low gear holder in inoperative position.

On a portion of the frame of the auto, indicated at 1, the gear shift pedal 2 is mounted on shaft 3, means for attaching the usual spring for drawing pedal to high gear position, indicated in dotted lines of Fig. 1, being conventionally shown at 4, pedal 2 projecting upwardly through a suitable aperture 5 in foot boards 6 and terminating in foot plate 7. A lining or protecting piece 8, of metal or other suitable material, covers the foot board around the edges of aperture 5. All of above parts are those now in common use and form no part of my invention.

I provide a plate 9, offset at each end as at 10 and 11 to raise the attachment above the foot board, to give clearance for parts and to give the attachment the desired slant and position. Slots 12 are provided in the offsets 10 and 11 for adjustably accommodating attaching means as bolts 13. A secondary offset 11' may be provided to accommodate the lining piece 8.

The attachment is so positioned that in the course of its reciprocations the pedal 2 will move parallel with and close to the edge of plate 9 as clearly indicated in Figs. II and III.

On the under side of plate 9, and near the edge thereof adjacent pedal 2, are mounted the neutral and low gear locks next described. The neutral lock consists of a stop member 15 pivotally mounted at 16 on plate 9 and connected by link 17 with lever 18 fulcrumed at 19 and extending through slot 20 and terminating in heel plate 21, lever 18 being thus adapted for lateral movement by the heel of the driver's foot which operates pedal 2 and it will be evident that such lateral movement of lever 18 to position shown in Fig. III will withdraw neutral lock 15 from the path of movement of lever 2, this being clearly indicated at Fig. III.

Any suitable means, as spring 22 attached to plate 9 at 23, are provided for normally yieldingly holding lever 18 in position shown in Figs. I and II thus holding neutral lock 15 yieldingly in position to engage pedal 2 and hold it against movement toward high gear position. That edge of neutral lock 15 which will be engaged by pedal 2 in movement to the right (that is, from high gear to neutral or beyond) is so constructed, preferably slanting as at 15' across the path of movement of pedal 2, that, in moving to the right, pedal 2 will force lock 15 and lever 18 to the position shown in Fig. III until pedal 2 passes lock 15 whereupon lock 15 and lever 18 will, because of spring 22, automatically return to normal neutral-locking position as in Figs. I and II and will there remain until withdrawn by lateral movement of lever 18 by the driver's heel or other external force.

Low gear lock 24 is pivotally mounted at 25 and is provided with a suitable recess 26 for engaging pedal 2 and with stops 27 and 28 for engaging lug 29 to limit the revolutionary movement of the lock as desired. Lock 24 is further provided with ratchet means as teeth 30 and dog 31 pivoted at 32 and actuated by suitable spring means as 33 for normally causing dog 31 to engage teeth 30 as indicated in dotted lines, Fig. II, and prevent rotation of the lock 24 in the direction indicated by the arrow in Fig. III. When lever 18 is moved laterally the end 18' thereof will engage the upper arm of dog 31 and disengage the dog from teeth 30, thus permitting revolution of lock 24 in the direction of the arrow.

For locking the dog 31 out of engagement with teeth 30 I provide a stop member 34 having a pin 35 revolubly mounted in plate 9 and with suitable operating means as lever 36 attached to the pin on the upper side of plate 9 whereby upon manual movement of lever 36 stop 34 may be moved into engagement with dog 31 for holding the dog out of engagement with teeth 30, as shown in Fig. II. Movement of lever 36 in the opposite direction will, obviously, disengage stop 34 and dog 31, whereupon the dog will automatically engage teeth 30 and reestablish the operative condition in lock 24.

In operation the pedal 2 is normally in high gear position indicated in dotted lines at Fig. I. If desired to lock the pedal in neutral position it is necessary only to push the pedal forward to or beyond neutral position. The neutral lock 15 is pushed to the side by the pedal 2 in passing and then automatically returns to locking position as in Figs. I and II, thus holding pedal 2 in neutral position until released by lateral movement of lever 18.

If desired to move pedal 2 into low gear position it is pushed forward into that position (shown in Fig. III). In this movement pedal 2 enters recess 26 and revolves lock 24, in direction opposite to the arrow, as far as necessary in order to allow pedal 2 to move to its forward limit, in which position it will be locked, because of the engagement of dog 31 with teeth 30, until released by lateral movement of lever 18. When thus released the pedal 2, being always drawn toward high gear position by the spring attached at 4, will revolve lock 24 to position shown in Fig. II and pass out of recess 26 and to the neutral stop 15 or, if lever 18 is retained in release position, as in Fig. III, pedal will pass directly to high gear.

By means of slots 12 the attachment may be longitudinally adjusted so as to position neutral stop 15 at the desired point and, in case of wear or stretching of parts resulting in change of pedal position for neutral, the attachment may be readjusted to meet such change by the same means.

It will be understood that lever 36 is merely a conventional illustration of any suitable operating means for lock 34. Also that the attachment may be attached to the foot board or by any other suitable means and that many other details of construction may be changed without departure from the spirit of my invention.

I claim:

1. In a gear shift lever lock a plate, means for mounting the same adjacent the lever, a stop member carried by the plate and normally lying in the path of movement of the lever for holding the lever at one point against movement in one direction but adapted to be moved out of said path by movement of the lever in the opposite direction, ratchet means carried by the plate for engaging and holding the lever at another point and single means carried by the plate for causing both said member and said ratchet means to release the lever.

2. In a locking device for a gear shift lever normally held resiliently in high gear position but adapted to be moved to neutral and low gear positions, stop means adapted to permit the lever to pass from high gear to neutral position and to automatically hold the lever against movement from neutral position toward high gear position and automatically operable and adjustable means for engaging and holding the lever in low gear position.

3. In a locking device for a gear shift lever normally held resiliently in high gear position but adapted to be moved to neutral and low gear positions, stop means for normally holding the lever at neutral position, automatically adjustable means for engaging and holding the lever in low gear position and single means for releasing both said holding means.

4. In a locking device for a gear shift lever having resilient means constantly drawing the lever toward or holding it in a first position but adapted to be moved to second and third positions, means for holding the lever in second position, automatically adjustable means for holding the lever in third position and means for releasing both said holding means.

5. In a locking device for a gear shift lever having resilient means constantly drawing the lever toward or holding it in a first position but adapted to be moved to second and third positions, means for holding the lever in second position, automatically adjustable means for holding the lever in third position, means for locking said low gear holding means in inoperative position, and means for releasing both said holding means.

6. An attachment for motor vehicles having a three position pedal constantly but resiliently drawn toward a first position, comprising a plate, a member carried by the plate for holding the lever in second position, other means carried by the plate for holding the lever in third position and single means for releasing both of said holding means.

7. An attachment for motor vehicles having a three position pedal constantly but resiliently drawn toward a first position, comprising a plate, means for adjustably attaching the same to the vehicle, a member carried by the plate for holding the lever in second position, other means carried by the plate for holding the lever in third position and single means for releasing both of said holding means.

8. An attachment for motor vehicles having a three position pedal constantly but resiliently drawn toward a first position, comprising a plate, a member carried by the plate for holding the lever in second position, other means carried by the plate for automatically and adjustably holding the lever in third position and single means for releasing both of said holding means.

In testimony whereof I affix my signature.

JOHN SANDERS.